United States Patent
Torigoe et al.

(10) Patent No.: US 6,423,432 B1
(45) Date of Patent: Jul. 23, 2002

(54) HIGH TEMPERATURE CORROSION-RESISTANT AND ABRASION-RESISTANT COATING MEMBER, AND MANUFACTURING METHOD THEREOF

(75) Inventors: Taiji Torigoe; Hisataka Kawai; Koji Takahashi, all of Takasago (JP)

(73) Assignee: Mitsubishi Heavy Industry, Ltd., Tokyo (JP)

( * ) Notice: Subject to any disclaimer, the term of this patent is extended or adjusted under 35 U.S.C. 154(b) by 0 days.

(21) Appl. No.: 09/438,724

(22) Filed: Nov. 11, 1999

(30) Foreign Application Priority Data

Nov. 13, 1998 (JP) ............................. 10-323284

(51) Int. Cl.⁷ ............................. B32B 15/00; B05D 1/02
(52) U.S. Cl. .................. 428/698; 428/699; 428/336; 428/627; 427/405; 427/419.7; 416/241 R
(58) Field of Search ................. 428/627, 650, 428/651, 680, 698, 699, 336, 469; 416/241 R; 427/405, 419.7

(56) References Cited

U.S. PATENT DOCUMENTS

| | | |
|---|---|---|
| 4,275,090 A | 6/1981 | McComas et al. |
| 4,649,086 A | 3/1987 | Johnson |
| 6,001,492 A | * 12/1999 | Jackson et al. ............. 428/610 |

FOREIGN PATENT DOCUMENTS

| | | |
|---|---|---|
| CN | 1221045 A | 6/1999 |
| EP | 0 690 144 A1 | 1/1996 |
| FR | 2370106 A | 10/1977 |
| JP | 59 157272 | 9/1984 |
| JP | 05 044011 | 2/1993 |
| JP | 9-507280 | 7/1997 |
| JP | 11 080920 | 3/1999 |

OTHER PUBLICATIONS

T.N. Rhys–Jones et al., *Surface and Coatings Technology,* 1990, 42:13–19, No month.
G.C. Wood et al., *Oxidation of Metals,* 1980, 14:1, pp. 47–63, No month.
Michael A. Gedwill et al., *American Society For Metals,* 1974, 106:3, pp. 66–68, No month.

* cited by examiner

Primary Examiner—Deborah Jones
Assistant Examiner—Jennifer McNeil
(74) Attorney, Agent, or Firm—Morgan & Finnegan, LLP

(57) ABSTRACT

A high temperature corrosion-resistant and abrasion-resistant coated member or part which is suitable for use under a severe high temperature corrosive and severe abrasive environment and in flying particles, and a manufacturing method thereof are provided. A manufacturing method of a high temperature corrosion-resistant and abrasion-resistant coated member wherein an Al diffusion and infiltration treatment is performed after a chromium carbide coating has been applied onto the surface of a base material, or wherein a chromium carbide coating layer whose outside surface is an Al diffusion layer is formed on the surface of the base material, and a gas turbine blade comprising the above member are provided.

3 Claims, 4 Drawing Sheets

US 6,423,432 B1

HIGH TEMPERATURE CORROSION-RESISTANT AND ABRASION-RESISTANT COATING MEMBER, AND MANUFACTURING METHOD THEREOF

BACKGROUND OF THE INVENTION

1. Field of the invention

The present invention relates to a high temperature corrosion-resistant and abrasion-resistant coated member suitable for use under a high temperature corrosive and abrasive environment, such as a turbine rotor blade and a stator blade of a gas turbine for power generation, and a manufacturing method thereof.

2. Description of the related art

Recently, in a gas turbine, there has been a tendency to use poorly graded fuels for reducing the running cost. A turbine which uses a fuel made from coals gasified in a pressurized fluid bed boiler among the poorly graded fuels is under a more severe high temperature corrosive environment because of corrosive components such as Na (sodium), K (potassium), Cl (chlorine) or S (sulfur) than a turbine which uses conventional natural gas fuel or oil fuel, and at the same time, it is under a very severe abrasive environment because of flying particles (fine grain flying ashes). Therefore, in high temperature parts of a gas turbine which use a fuel made from coals gasified in a pressurized fluid bed boiler, especially in a turbine rotor blade or a stator blade whose service conditions are severe, for example, the materials shown below are used. That is, they are a material in which as shown in FIG. 6, an Al diffusion and infiltration coating is given on the surface of a base material 1 such as a Co radical alloy or an Ni radical alloy to form an Al diffusion layer 4 for improving the corrosion resistance, and a material in which as shown in FIG. 7, an MCrAlY (M is Co, Ni, Co+Ni, or Fe) thermal spraying coating is given on the surface of a base material 1 to form an MCrAlY layer 5. However, these Al diffusion layer 4 and MCrAlY layer 5 are essentially formed for the principal purpose of improving the corrosion resistance, and the purpose of reducing the abrasion because of flying particles (erosion) is a minor one.

Furthermore, as shown in FIG. 8, a thermal spray coating of chromium carbide [75 wt % $Cr_3C_2$—25 wt % (50 wt % Ni—50 wt % Cr)] is given onto the surface of a base material 1 to form a chromium carbide layer 6, and such material is often used for a steam generating tube of a boiler or the like used under an abrasive environment. This material is excellent in abrasion resistance because of the fine scattered $Cr_3C_2$, but it is not used for a turbine blade which is a rotary member from the view point of the inferiority in ductility and tenacity because of a low matrix (connecting material) content. Furthermore, the Ni—Cr alloy of the above matrix is not used for a turbine blade also because the alloy is inferior to the MCrAlY coating in terms of high temperature corrosion resistance and oxidation resistance. Therefore, previously, there has been a problem that the lifetime of a turbine blade is extremely short in a rotor blade and a stator blade of a gas turbine used under an environment like this. By the way, the temperature at this damaged parts is about 600 to 800° C.

That is, in the conventional technology, no corrosion-resistant and abrasion-resistant coated member has been known which has both the corrosion and oxidation resistance and the abrasion resistance at the same time and which is capable of being used for parts exposed to the severe corrosive environment and the severe abrasive environment, for example, like a turbine rotor blade or a stator blade of a fluid bed boiler combustion gas turbine. Either the corrosion and oxidation resistance or the abrasion resistance has been severely compromised, and the lifetime of a member such as a turbine blade has been short.

SUMMARY OF THE INVENTION

In view of this state of art, it is an object of the present invention to provide a high temperature corrosion-resistant and abrasion-resistant coating member suitable for a member used under a severe high temperature corrosive environment and a very severe abrasive environment because of flying particles, like a high temperature part of a gas turbine using poorly graded fuels, and a manufacturing method thereof.

The present invention has the following 4 embodiments:

(1) A manufacturing method of a high temperature corrosion-resistant and abrasion-resistant coated member, which comprises the step of performing an Al diffusion and infiltration treatment after giving a chromium carbide coating on the surface of a base material.

(2) A high temperature corrosion-resistant and abrasion-resistant coated member comprising a chromium carbide coating layer whose outside surface is an Al diffusion layer and which is formed on the surface of a base material.

(3) The high temperature corrosion-resistant and abrasion-resistant coated member according to the above (2), wherein the thickness of the chromium carbide coating layer including the Al diffusion layer is 50 to 500 $\mu$m, and the thickness of the Al diffusion layer is 5 to 100 $\mu$m.

(4) A gas turbine blade comprising a chromium carbide coating layer whose outside surface is an Al diffusion layer and which is formed on the surface.

The high temperature corrosion-resistant and abrasion-resistant coated member according to the present invention is a member in which the corrosion resistance and the oxidation resistance are improved by diffusing and infiltrating Al into the surface of a chromium carbide coating layer with an excellent high temperature abrasion resistance, and it has both good corrosion and oxidation resistance and good abrasion resistance at the same time.

Accordingly, by applying the high temperature corrosion-resistant and abrasion-resistant coating member according to the present invention to a gas turbine or the like, it is possible to provide a high temperature part such as a turbine rotor blade and a stator blade, or a burner which can withstand a long time service under a very severe environment where abrasion and corrosion occurs at the same time, for example, in a pressurized fluid bed combustion gas turbine.

Furthermore, according to the method of the present invention, it is possible to easily manufacture a high temperature corrosion-resistant and abrasion-resistant coated member having the above performance.

DETAILED DESCRIPTION OF PREFERRED EMBODIMENTS

Figure 1:
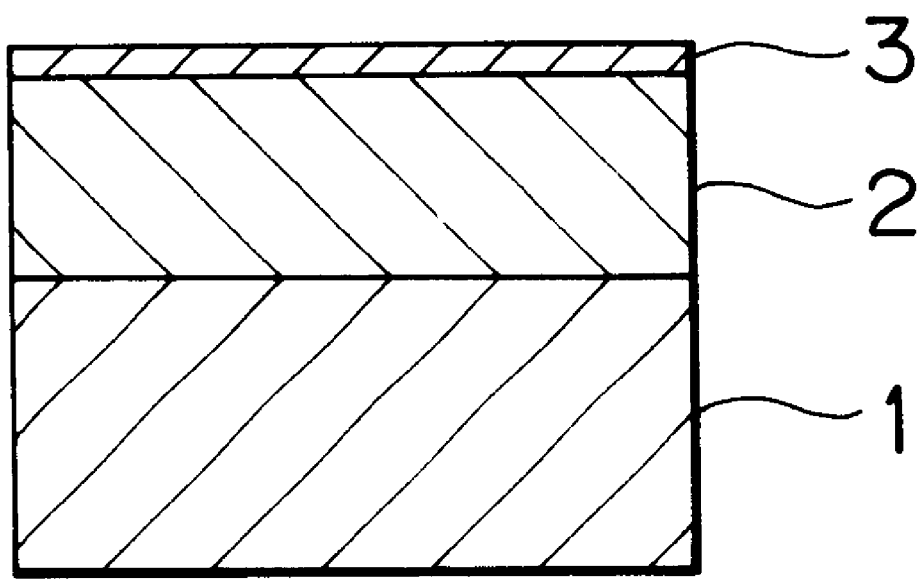
FIG. 1 is a cross sectional view showing the configuration of a high temperature corrosion-resistant and abrasion-resistant coated member according to the present invention.

A high temperature corrosion-resistant and abrasion-resistant coated member according to the present invention is a member in which a chromium carbide coating layer is formed on the surface of a base material made of a Co-base alloy, an Ni-base alloy, a heat resisting steel or the like, and the outside surface thereof is an Al diffusion layer. It is a member to which corrosion resistance and oxidation resistance at a high temperature are given by performing the Al diffusion and infiltration treatment to the chromium carbide coating layer excellent in high temperature abrasion resistance. As a result of this, it is possible to extend the lifetime of a high temperature member such as a turbine blade or a boiler tube. By the way, as an example of a base material especially suitable for a gas turbine blade, a Co-base alloy or an Ni-base alloy in Table 1 can be cited.

TABLE 1

Example of chemical composition of Co-base alloy and Ni-base alloy

| Material (trade mark) | Rough chemical composition (wt %) |
|---|---|
| X-45 | Co—11Ni—25.5Cr—7W—2Fe—0.25C |
| MarM509 | Co—23.5Cr—10Ni—7W—0.2Ti—3.5Ta—0.6C |
| IN939 | Ni—22.5Cr—19Co—2W—1.4Ta—1Nb—1.9Al—3.7Ti |

The chromium carbide coating is generally used as a high temperature abrasion-resistant coating, and generally, 75wt % $Cr_3C_2$,—25 wt % (50 wt % Ni—50 wt % Cr) is used. However, in the present invention, the mixture ratio of the Ni—Cr alloy to $Cr_3C_2$ is (40 to 80) : (60 to 20) in terms of weight % ratio, and preferably, the ratio is (50 to 75) : (50 to 25). This is because if the percentage of $Cr_3C_2$ exceeds 60% in terms of weight %, the tenacity of the coating is lowered and a crack can easily occur when used in a body of rotation, and further, because abrasion resistance decreases when the percentage of $Cr_3C_2$ is less than 20%. In the present invention, an Al diffusion and infiltration treatment is performed after the execution of the chromium carbide coating whose $Cr_3C_2$ content is lowered within the range in which the abrasion resistance is not adversely affected, so that the corrosion resistance and the oxidation resistance of the surface of the coating layer may considerably be improved.

In the formation of the chromium carbide coating, various kinds of thermal spraying methods such as atmospheric plasma thermal spraying (APS), low pressure plasma thermal spraying (LPPS), or high speed flame thermal spraying (HVOF) can be used. To prepare the thermal spraying powder, a powder of $Cr_3C_2$ is mixed into a powder of Ni—Cr and the powders are sufficiently mixed by using a ball mill or the like and after that, the powder is classified in terms of grain diameter distributions suitable for various kinds of thermal spraying.

The grain diameter distributions of the powder are distributions in which the powders are classified to standard grain diameter distributions specified by manufactures of thermal spraying units. That is, it is preferable that a powder whose grain diameter distribution is 45 μm or less is used in the LPPS and that a powder whose grain diameter distribution is 45 to 106 μm is used in the APS and that a powder whose grain diameter distribution is 16 to 53 μm is used in the HVOF.

The range of composition of an Ni—Cr alloy used in the chromium carbide coating is Ni: 20 to 80 wt % and Cr: 80 to 20 wt %.

It is preferable that the thickness of the chromium carbide coating layer is within the range of 50 to 500 μm.

After the chromium carbide coating has been given onto the surface of a base material to form a chromium carbide coating layer, the Al diffusion and infiltration treatment is performed onto the chromium carbide coating layer to form an Al diffusion layer on the surface of this coating layer. The Al diffusion and infiltration treatment is carried out, for example, by performing the heating for 2 to 50 hours at 800 to 1000° C. in the atmosphere of the mixture of aluminum chloride gas ($AlCl_3$) and hydrogen gas ($H_2$), so that an Al concentration layer (Al diffusion layer) may be formed to a depth of 5 to 100 μm from the surface of the above coating layer.

EXAMPLES

The present invention will be described below more specifically by referring to examples.

By the method according to the present invention, as shown in FIG. 1, a chromium carbide coating layer 2 was formed on the surface of a base material 1, and a sample (test piece) of a corrosion-resistant and abrasion-resistant coating member in which an Al diffusion layer 3 was formed on the surface of the chromium carbide coating layer 2 was prepared, and the performance was evaluated.

The X-45 (trade mark) which was a Co-base alloy was used as base material 1. The chemical composition of this X-45 is Co—11Ni—25.5Cr—7W—2Fe—0.25C. Furthermore, as a chromium carbide coating layer, a chromium carbide coating layer with the mixture ratio of [50 wt % $Cr_3C_2$—50 wt % (50 wt % Ni—50 wt % Cr)] was used for material 1 of the present invention in Table 2, and a chromium carbide coating layer with the mixture ratio of [25 wt % $Cr_3C_2$—75 wt % (50 wt % Ni—50 wt % Cr)] was used for the material 2 of the present invention. These are considered to have a high tenacity and to be capable of being applied to a body of rotation. By the way, the coating powder was prepared in such a way that the Ni—Cr alloy powder and the $Cr_3C_2$ powder were sufficiently mixed by using a ball mill and were classified to 45 to 106 μm which was a grain diameter distribution suitable for the APS.

TABLE 2

Composition of samples

| | Sample No. | Base material | Quality of chromium carbide coating layer | Total thickness of coating layer (mm) |
|---|---|---|---|---|
| Present invention | 1 | X-45 | [50% $Cr_3C_2$ + 50% NiCr] + Aluminum diffusion layer | 0.2 |
| | 2 | X-45 | [25% $Cr_3C_2$ + 75% NiCr] + Aluminum diffusion layer | 0.2 |
| Comparative examples | 3 | X-45 | 75% $Cr_3C_2$ + 25%NaCr | 0.2 |
| | 4 | X-45 | CoNiCrAlY | 0.2 |

The preparation of samples was performed as follows:

First, the surface of the X—45 which was a base material was subjected to the grid blast treatment by using $Al_2O_3$ grains, so that the surface of the base material might be in the condition suitable for the plasma thermal spraying. After that, the thermal spraying of the mixed powder of a $Cr_3C_2$ powder with the above composition and an Ni—Cr alloy powder was performed by the APS method to form a chromium carbide coating layer. The thickness of the chromium carbide coating layer was 0.2 mm. After the formation of the chromium carbide coating layer, an Al diffusion and infiltration treatment was executed by performing the heating for 20 hours under the condition of 870° C. in the atmosphere of the mixture of aluminum chloride gas ($AlCl_3$) and hydrogen gas ($H_2$) to form an Al diffusion layer to a depth of about 30 $\mu$m from the surface of the chromium carbide coating layer by the following reaction: $AlCl_3 + \frac{3}{2}H_2 = Al$ (diffused onto the surface of the chromium carbide coating layer)+3HCl (evaporated due to high temperature).

As a sample for comparison, as shown in Table 2, material 3 for comparison in which a chromium carbide coating layer was formed on a base material by a conventional method and material 4 for comparison in which a CoNiCrAlY coating layer was formed were prepared.

The coating layer of material 3 for comparison was a normal chromium carbide coating [75 wt % $Cr_3C_2$—25 wt % (50 wt % Ni —50 wt % Cr)] layer previously often used as a high temperature abrasion-resistant coating of a boiler tube or the like, and the layer was formed in such a way where a thermal spraying powder classified to a grain diameter distribution of 45 to 106 $\mu$m suitable for the APS method was used and the thermal spraying was performed by using the APS method. The thickness of the above chromium carbide coating layer was 0.2 mm.

The coating layer of the material 4 for comparison was a CoNiCrAlY coating layer used as a conventional corrosion-resistant and oxidation-resistant coating, and the layer was formed in such a way where a thermal spraying powder classified to a grain diameter distribution of 44 $\mu$m or less suitable for the LPPS method was used and the thermal spraying was performed by using the LPPS method. The thickness of this coating layer was 0.2 mm.

Finally, in order to improve the adhesive strength of the corrosion-resistant and abrasion-resistant coating, a vacuum heat treatment (vacuum degree was $10^{-3}$ to $10^{-4}$ Torr) in which the heating temperature was 1000° C. and the heating time length was 2 hours was performed as a diffusion and heat treatment for each test piece. The composition of the prepared samples or the like is shown in Table 2.

Figure 2:
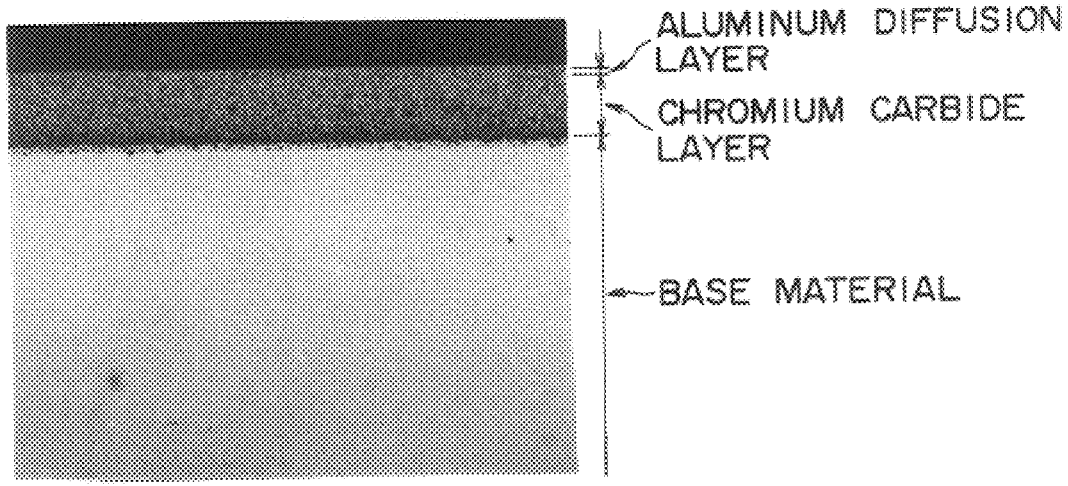
FIG. 2 and FIG. 3 are microphotographs showing the cross sectional microstructure of sample 1 prepared in the example.
Figure 3:
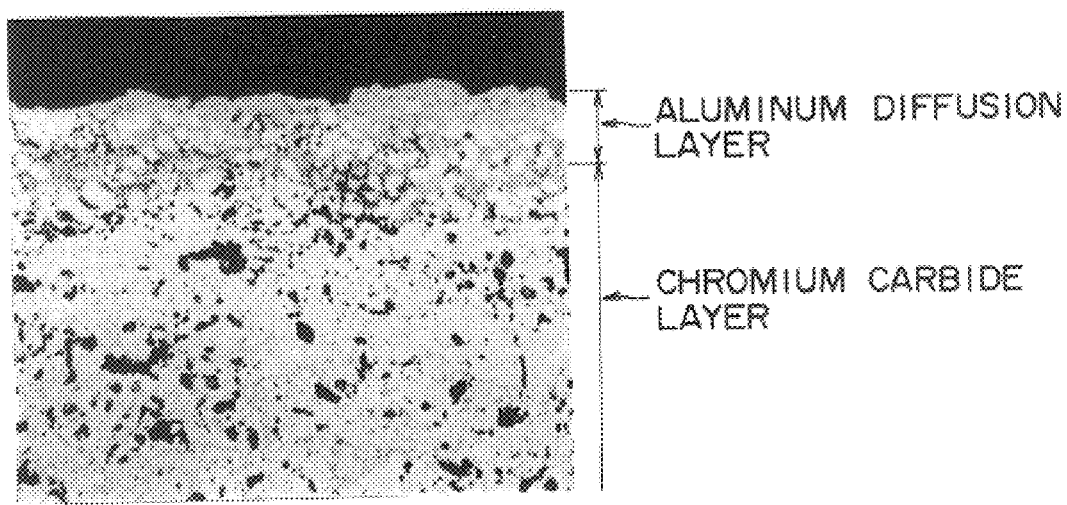
Figure 4:
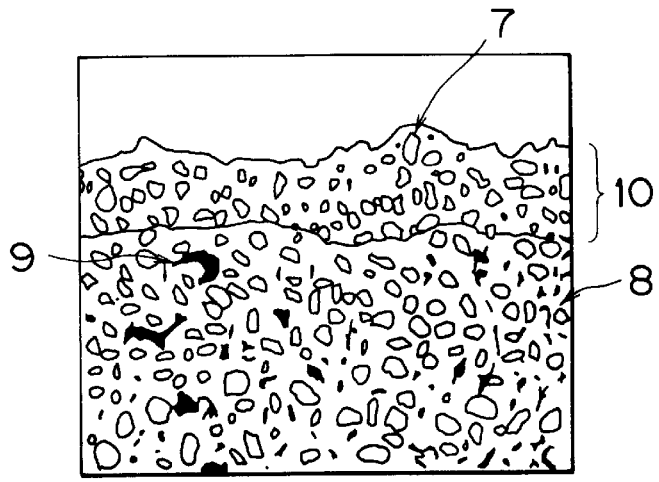
FIG. 4 is a sketch of the microphotograph of FIG. 3.

By the way, the typical photographs of the cross sectional microstructure of material 1 of the present invention to which the heat treatment has excuted are shown in FIG. 2 and FIG. 3, and a sketch thereof is shown in FIG. 4. FIG. 2 is a photograph at a magnification of ×100, and FIG. 3 is a photograph at a magnification of ×500. It is clear from these figures that white $Cr_3C_2$ (shown in FIG. 4 by numeral 7) is minutely scattered in the Ni—Cr matrix 8 and that an Al concentration layer (Al diffusion layer 10) is formed on the surface.

By using the test pieces of samples 1 to 4 prepared like this, the performance evaluation was performed by the oxidation test, corrosion test, and abrasion test.

In the oxidation test, the heating in an atmospheric furnace (at 700° C. for 1000 hours) was performed, and after the test, the cross sectional microstructure was observed, and the condition of oxidation of the coating layer and the thickness of the residual coating were evaluated.

In the corrosion test, the molten salt (80% $Na_2SO_4$+20% NaCl) coating type was employed, and the test was performed by such a method where an operation for 20 hours at 700° C. (1 cycle) is repeated 10 times. After the test, the cross sectional microstructure was observed, and the condition of corrosion of the coating layer and the thickness of the residual coating were evaluated.

Figure 5:
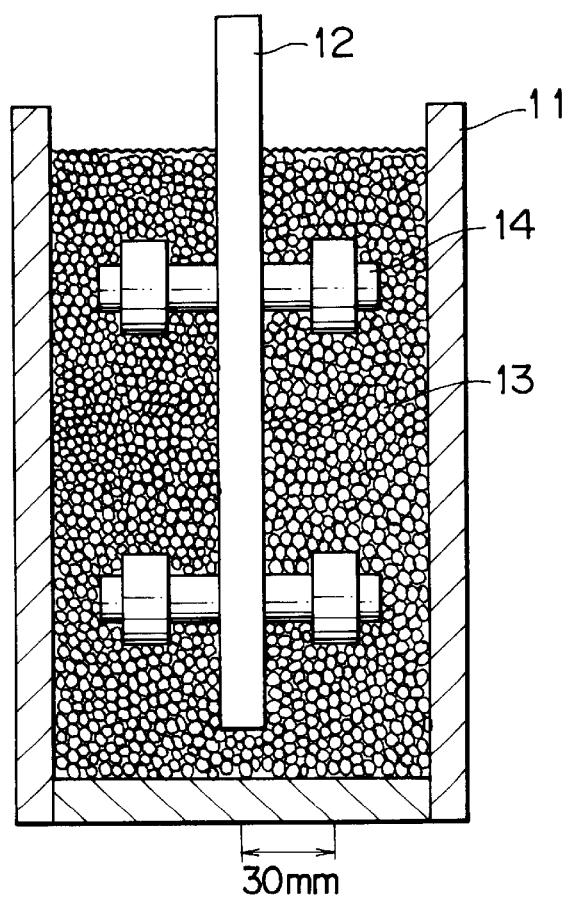
FIG. 5 is a conceptual diagram describing the configuration of a rotary type abrasion tester used in the abrasion test in the example.
Figure 6:
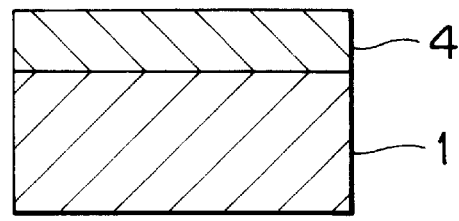
FIG. 6 to FIG. 8 are cross sectional views showing configurations of the conventional high temperature corrosion-resistant and abrasion-resistant coated members.
Figure 7:
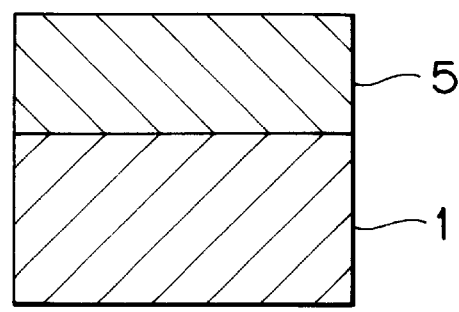
Figure 8:
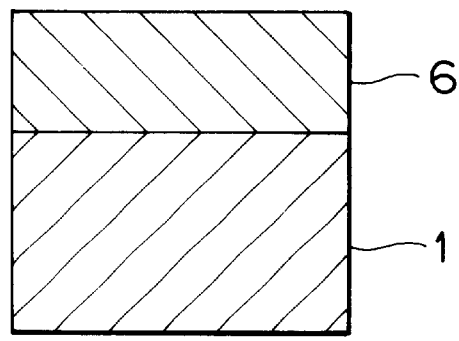

The abrasion test was performed by using a rotary type abrasion tester shown in FIG. 5 in order to evaluate the abrasion characteristics because of particles. This tester was a tester in which an abrasion test piece 14 mounted on a rotary shaft 12 was rotated in a vessel 11 filled up with alumina particles 13 with a diameter of 1±0.1 mm. At this moment, the test was performed in the atmosphere at a test temperature of 700° C., and the rotational speed was 10 rpm, and the test time length was 8 hours. In this case, the distance of rubbing of the test piece was about 900 m. The abrasion resistance was evaluated by the depth of abrasion of the thickness of the coating layer caused by this abrasion test.

The results of these tests are shown in Table 3, and it can be recognized that the respective physical properties are improved in a good balance without giving too much importance to the corrosion resistance or the abrasion resistance when comparing the materials 1, 2 of the present invention with the materials 3, 4 for comparison.

By the way, in this example, the materials of the present invention were prepared by using the APS method as a thermal spraying method, but it is clear that similar effects can be obtained by using various kinds of thermal spraying methods such as the LPPS method or the HVOF method.

TABLE 3

Performance evaluation test result

| | Sample No. | Oxidation test (thickness reduction depth) | Corrosion test (thickness reduction depth) | Abrasion test (thickness reduction depth) |
|---|---|---|---|---|
| Present invention | 1 | 1.0 | 1.0 | 1.0 |
| | 2 | 0.9 | 1.0 | 1.8 |
| Comparative examples | 3 | 3.8 | 9.5 | 0.9 |
| | 4 | 0.9 | 0.9 | 11.2 |

The thickness reduction depth means the depth of reduction of the thickness of the coating layer caused by abrasion, and it is shown in terms of a relative value when letting the value of sample 1 be 1.0.

What is claimed is:

1. A method of manufacturing a high temperature corrosion-resistant and abrasion resistant coating on a member made of a base material comprising the steps of:
   thermal spraying a powder mixture of a Ni—Cr alloy and $Cr_3C_2$, in a ratio of 40–80:60–20 by weight % of Ni—Cr alloy to $Cr_3C_2$, onto a surface of the base material to form a chromium carbide coating layer; and
   applying by diffusion and infiltration treatment an Al diffusion layer onto the chromium carbide coating layer at a temperature of 800° C. to 1000° C. to form an Al diffusion layer of 5 to 100 $\mu$m in thickness on an outside surface of the coating.

2. A high temperature corrosion-resistant and abrasion-resistant coated member made of a base material produced by the method of claim 1, wherein the thickness of the chromium carbide coating layer including the Al diffusion layer on the surface of the base material is 50 to 500 $\mu$m and the thickness of the Al diffusion layer is 5 to 100 $\mu$m.

3. A gas turbine made of a base material wherein the base material is provided with a coating manufactured by the method of claim 1, wherein the thickness of the chromium carbide coating layer including the Al diffusion layer is 50 to 500 $\mu$m and the thickness of the Al diffusion layer is 5 to 100 $\mu$m.

* * * * *